United States Patent
Hancu et al.

(10) Patent No.: US 7,655,203 B2
(45) Date of Patent: Feb. 2, 2010

(54) MULTI-COMPONENT CATALYST SYSTEM AND METHOD FOR THE REDUCTION OF $NO_x$

(75) Inventors: Dan Hancu, Clifton Park, NY (US); Benjamin Hale Winkler, Albany, NY (US); Benjamin Rue Wood, Niskayuna, NY (US); Daniel George Norton, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/204,845

(22) Filed: Sep. 5, 2008

(65) Prior Publication Data

US 2009/0004079 A1 Jan. 1, 2009

Related U.S. Application Data

(63) Continuation-in-part of application No. 11/242,655, filed on Oct. 4, 2005, now Pat. No. 7,431,905.

(51) Int. Cl.
*B01D 53/56* (2006.01)
*B01D 53/94* (2006.01)
*B01J 8/00* (2006.01)
*B01J 19/00* (2006.01)

(52) U.S. Cl. ............. 423/213.2; 423/213.5; 423/239.1; 423/239.2; 422/168; 422/169; 422/170; 422/171; 422/177; 422/180

(58) Field of Classification Search ............. 423/213.2, 423/213.5, 239.1, 239.2; 422/168–171, 177, 422/180
See application file for complete search history.

(56) References Cited

U.S. PATENT DOCUMENTS

| | | | |
|---|---|---|---|
| 5,238,890 A * | 8/1993 | Hayasaka et al. ............. 502/61 |
| 5,312,608 A * | 5/1994 | Hayasaka et al. ........ 423/213.5 |
| 5,474,965 A | 12/1995 | Nakatsuji et al. |
| 6,193,942 B1 | 2/2001 | Okuda et al. |
| 6,284,211 B1 | 9/2001 | Miyadera et al. |
| 6,703,343 B2 | 3/2004 | Park |
| 7,049,261 B2 | 5/2006 | Nam et al. |
| 7,335,295 B2 | 2/2008 | van den Berge et al. |
| 7,344,697 B2 | 3/2008 | Corma Canós et al. |
| 7,364,650 B2 | 4/2008 | Font Freide |
| 7,431,905 B2 * | 10/2008 | Hancu et al. ............. 423/213.2 |
| 2002/0094314 A1 | 7/2002 | Miyadera et al. |

FOREIGN PATENT DOCUMENTS

| | | |
|---|---|---|
| DE | 19754627 A1 | 6/1999 |
| EP | 0710499 A2 | 5/1996 |
| EP | 0714693 A1 | 6/1996 |
| EP | 0719580 A1 | 7/1996 |
| EP | 0761289 A2 | 3/1997 |
| JP | 1986011147 A | 1/1986 |
| JP | 6-79140 A * | 3/1994 |
| JP | 1996038854 A | 2/1996 |

OTHER PUBLICATIONS

Miyadera, "Selective Reduction of NOx by Ethanol on Catalysts Composed of Ag/Al2O3 and Cu/TiO2 Without Formation of Harmful By-Products", Applied Catalysis B: Environmental, vol. 16, pp. 155-164, 1998.

Kameoka et al., "Role of organic Nitro Compounds in Selective Reduction of NOx With Ethanol Over Different Supported Silver Catalysts", Catalysis Letters, vol. 51, pp. 11-14, 1998.

Kameoka et al., "Reactivity of Surface Isocyanate Species With NO, O2, and NO + O2 in Selective Reduction of NOx Over Ag/Al2O3 and Al2O3 Catalysts", Catalysis Letters, vol. 55, pp. 211-215, 1998.

Eränen et al., "Continuous Reduction of NO With Octane Over A Silver/Alumina Catalyst In Oxygen-Rich Exhaust Gages: Combined Heterogeneous and Surface-Mediated Homogeneous Reactions", Journal of Catalysis, vol. 219, pp. 25-40, 2003.

Kameoka et al., "Selective Catalytic Reduction of NOx With CH3OH, C2H5OH and C3H6 in the Presence of O2 Over Ag/Al2O3 Catalyst: Role of Surface Nitrate Species", Phys. Chem. Chem. Phys., vol. 2, pp. 367-372, 2000.

U.S. Appl. No. 11/022,901, filed Dec. 22, 2004, entitled "Catalyst System and Method for the Reduction of NOx".

U.S. Appl. No. 11/022,897, filed Dec. 22, 2004, entitled Catalyst System and Method for the Reduction of NOx.

* cited by examiner

*Primary Examiner*—Timothy C Vanoy
(74) *Attorney, Agent, or Firm*—Francis T. Coppa

(57) ABSTRACT

A catalyst system for the reduction of $NO_x$ is disclosed. One embodiment of the catalyst system is based on a catalyst in a first zone, including a catalyst support, gallium, and at least one promoting metal; and a catalyst in the second zone following the first zone. The second-zone catalyst includes a second catalyst support and a zeolite material. The catalyst system further includes a gas stream comprising an organic reductant, such as a hydrocarbon material or a compound containing oxygen or nitrogen. A method for reducing $NO_x$, utilizing the catalyst system, is also described.

30 Claims, No Drawings

MULTI-COMPONENT CATALYST SYSTEM AND METHOD FOR THE REDUCTION OF $NO_x$

CROSS REFERENCE TO RELATED APPLICATIONS

This application is a Continuation-in-Part application of Ser. No. 11/242,655, filed on Oct. 4, 2005 now U.S. Pat. No. 7,431,905 B2.

BACKGROUND

This invention relates generally to a catalyst system and method for the reduction of nitrogen oxide emissions, and more particularly to a catalyst system that comprises a multi-component catalyst and a reductant.

Methods have long been sought to reduce the deleterious effects of air pollution caused by byproducts resulting from imperfect high-temperature combustion of organic materials. When combustion occurs in the presence of excess air and at high temperatures, harmful byproducts, such as nitrogen oxides, commonly known as $NO_x$, are created. $NO_x$ and subsequent derivatives have been suggested to play a major role in the formation of ground-level ozone that is associated with asthma and other respiratory ailments. $NO_x$ also contributes to soot formation, which is linked to a number of serious health effects, as well as to acid rain and the deterioration of coastal estuaries. As a result, $NO_x$ emissions are subject to many regulatory provisions limiting the amount of $NO_x$ that may be present in effluent gas vented into the surrounding environment.

One known method for dealing with $NO_x$ involves the use of selective catalytic reduction (SCR) to reduce $NO_x$ to nitrogen gas ($N_2$), using ammonia ($NH_3$) as a reductant. However, as ammonia's own hazardous consequences are well known, the use of $NH_3$ in an SCR system presents additional environmental and other problems that must also be addressed. As regulatory agencies continue to drive limits on $NO_x$ emission lower, other regulations are also driving down the permissible levels of $NH_3$ that may be emitted into the atmosphere. Because of regulatory limits on ammonia, the use of hydrocarbons and/or their oxygen derivatives for $NO_x$ reduction in an SCR process is very attractive. Numerous catalysts have been suggested for this purpose, including zeolites, perovskites, and metals on metal oxide catalyst support. However, existing catalyst systems have either low activity or a narrow region of working temperatures, or low stability to water, which are detrimental to practical use. U.S. Pat. No. 6,703,343 teaches catalyst systems for use in $NO_x$ reduction. However, these catalyst systems require a specially synthesized metal oxide catalyst support with a very low level of impurities. Other catalyst systems known to reduce NOx have exhibited very little control over the products formed from the reduction, and in particular, exhibit poor selectivity towards $N_2$ as a product. Therefore, there is a need for an effective catalyst system to reduce $NO_x$ emissions, which system is stable and operable over a wide range of temperatures.

BRIEF DESCRIPTION OF THE INVENTION

In one embodiment, the invention provides a catalyst system for the reduction of $NO_x$, comprising (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium and mixtures thereof; (ii) a catalyst in a second zone following said first zone; said catalyst comprising a second catalyst support and a zeolite material; and (iii) a gas stream comprising $NO_x$ and an organic reductant. The organic reductant can comprise oxygen, nitrogen, or a combination of oxygen and nitrogen. The organic reductant can alternatively comprise a hydrocarbon material. The catalysts in the first zone and second zone are substantially separated from each other.

In another embodiment, the invention provides a method for reducing $NO_x$, which comprises the steps of (a) providing a gas stream comprising $NO_x$ and an organic reductant, as described herein; and (b) contacting said gas stream with a catalyst system, wherein said catalyst system comprises (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, and indium; and (ii) a catalyst in a second zone following said first zone; said catalyst comprising a second catalyst support, and a zeolite material. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise.

In one embodiment, the present invention comprises a catalyst system for the selective reduction of $NO_x$, which catalyst system comprises a catalyst in a first zone, a catalyst in a second zone following said first zone, and a reductant. The catalyst in the first zone comprises a first catalyst support, a first catalytic metal comprising gallium, and at least one promoting metal. The catalyst in the second zone comprises a second catalyst support, and a zeolite material. The reductant comprises an organic compound. The organic compound can comprise oxygen or nitrogen (or mixtures thereof); or a hydrocarbon composition. The catalyst system may also comprise an optional catalyst in a third zone following said second zone. The catalyst in the third zone may comprise a third catalyst support, and a third catalytic metal selected from the group of platinum, palladium, and mixtures thereof.

Catalyst supports may comprise alumina, titania, zirconia, ceria, silicon carbide or any mixture of these materials. Typically, the catalyst support comprises gamma-alumina with a high surface area comprising impurities of at least about 0.2% by weight in one embodiment, and at least about 0.3% by weight in another embodiment. The catalyst support may be made by any method known to those of skill in the art, such as co-precipitation, spray drying or sol-gel methods for example. The catalyst in the first zone, sometimes hereinafter referred to as "Selective Reduction Catalyst" or "SRC", comprises gallium. In a particular embodiment, the catalyst comprises from about 1 mole % to about 31 mole % of gallium, wherein mole percent is determined by dividing the number of moles of catalytic metal by the total number of moles of the metal components in the catalyst, including the catalyst support and any promoting metal present. In some embodiments, the concentration of gallium is in the range of about 5 mole % to about 31 mole %.

The catalyst in the first zone comprises at least one promoting metal. The promoting metal may be selected from the group consisting of silver, gold, vanadium, zinc, tin, bismuth, cobalt, molybdenum, tungsten, indium and mixtures thereof. The catalyst in the first zone typically comprises from about 1 mole % to about 22 mole % of the promoting metal, based on total moles of first catalytic metal, promoting metal, and first catalyst support. It should be appreciated that the term "promoting metal" is meant to encompass elemental metals, metal oxides or salts of the promoting metal, such as $CO_2O_3$ for example.

The catalyst in the second zone is sometimes referred to herein as a "RONO Destruct Catalyst" or "RDC". (The term "RONO" is meant to describe a compound that can be oxidized to $NO_x$ compounds (with eventual conversion to nitrogen gas) and a mixture comprising $CO_2$ and $H_2O$). The RONO catalyst comprises a zeolite material. Zeolite materials are known in the art, and described in a variety of references. Non-limiting examples include the following U.S. Pat. Nos. 7,364,650 (Font Freide); 7,344,697 (Corma Canos et al); 7,335,295 (van den Berge et al); and 7,049,261 (Nam et al); all of which are incorporated herein by reference. As those skilled in the art understand, the zeolites can be natural or synthetic materials.

Examples of the natural zeolite materials include analcime, chabazite, clinoptilite, erionite, mordenite, laumontite, phillipsite, gmelinite, brewsterite, heulandite, natrolite, stilbite, and faujasite. Examples of commercial zeolite materials include: ZSM-5, ZSM-12, ZSM-22, ZSM-23, ZSM-34, ZSM-35, ZSM-38, ZSM-48; ZSM-50; ZSM-57, silicalite, silicalite 2; zeolite A, zeolite Y, zeolite X, zeolite beta, and ferriertie. Combinations of zeolites are also possible. Moreover, in some embodiments for this invention, the zeolite materials are characterized by an intermediate pore size in the range of about 3 angstroms to about 7 angstroms. (As used herein, the term "zeolite" is meant to also include other "zeotype" materials, as described, for example, in the Font Freide patent referenced above, as well as in U.S. Pat. Nos. 6,241,960 (Tops.o slashed.e et al) and 7,268,268 (al-Soufi et al), which are incorporated herein by reference).

In some embodiments, the zeolite material can be in a cation-exchanged form. Treatment of zeolite materials in this manner is also well-known in the art, and described, for example, in the Corma Canos patent referenced above. As those skilled in the art understand, zeolite materials can undergo cation-exchange with one or more of a variety of metallic ions, e.g., cations based on metals selected from the group consisting of iron, copper, cobalt, molybdenum, silver, platinum, palladium, gold, and rhodium. In some preferred embodiments, the zeolite material is exchanged with iron or copper cations, or a combination of the two cations. (Those skilled in the art understand that metals can be incorporated or impregnated into a zeolite material by various other techniques, i.e., other than an actual cationic exchange process).

The catalyst in the third zone, sometimes hereinafter referred to as a "Deep Oxidation Catalyst" or "DOC", comprises a catalytic metal. In one embodiment, the catalytic metal is selected from the group consisting of platinum, palladium, and mixtures thereof. The DOC may be prepared by techniques known to those skilled in the art. Alternately, it may be obtained from commercial sources.

The catalysts may be produced by methods known in the art. In one embodiment, the catalysts may be produced by an incipient wetness technique, comprising the application of homogenous and premixed precursor solutions for catalytic metal and promoting metal, contacted with the catalyst support. Precursor solutions for the catalytic metal and promoting metal may be prepared separately or in a single solution. The catalyst support materials are typically calcined before application of the precursor solution. In some embodiments after application of the precursor solution, a primary drying step at about 80° C. to about 120° C. for about 1 hour to about 2 hours is followed by a post-calcination process. The post-calcination may be carried out at a temperature in the range of from about 500° C. to about 800° C. In some embodiments, the post-calcination is carried out at a temperature in a range of from about 650° C. to about 750° C. In some embodiments, the post-calcination is done for a time in a range of about 2 hours to about 10 hours. In some other embodiments, the post-calcination is done for a time in a range of about 4 hours to about 8 hours.

The particles are sifted to collect and use those which are from about 0.1 micron to about 3000 microns in diameter. In one embodiment, the particle size ranges from about 400 microns to about 1000 microns in diameter. Based on the surface area and total pore volume of the catalyst support particles, the desired loading of the catalyst may then be calculated. As will be appreciated by those of ordinary skill in the art, the surface area and porosity may be lower, sometimes up to about 20-30% lower, in the final catalyst product as a result of catalyst loading. The theoretical loading capacity of the catalyst is determined by the total pore volume of the support, which determines the volume of metal precursors that can be loaded by incipient wetness. The precursor loading is chosen such that the amount of metal is typically less than a monolayer of the active metal on the catalyst support. In some embodiments, twice the pore volume is used as the total volume of precursor to load, and the metal loading is taken in the range of from about 1 millimole to about 5 millimoles of the mixture of catalytic metal and promoting metal per gram of catalyst support.

Precursor solutions of the catalytic metal and one or more promoting metals may be prepared in aqueous media, in hydrophilic organic media, or in a mixture thereof. Hydrophilic organic media comprise carboxylic acids, alcohols and mixtures thereof such as, but not limited to, acetic acid or ethanol. The solutions are typically made by mixing solvent with metal salts, such as, but not limited to, metal nitrates, citrates, oxalates, acetylacetonates, molybdates, or benzoates, in an amount to create a solution of appropriate molarity based on the desired catalyst composition. In some embodiments, the metal salt is a molybdenum heteropoly anion or ammonium molybdate. The methods used for preparing the catalyst system are known in the art, and include depositing catalyst support in a honey-comb support in a wash coating method, or extruding in a slurry into a desired form. The purity of the metal precursors for both catalytic metal and promoting metal is typically in the range of from about 95% to about 99.999% by weight. In one embodiment, all of the metal precursors are mixed together, and are as homogeneous as possible prior to addition to the catalyst support. In some other embodiments different metal precursors are added sequentially to the catalyst support.

In one embodiment, the desired volume of the precursor solution is added to coat the catalyst support and create a catalyst with the desired final catalyst loading. Once the metal salt solution or solutions have been added to the catalyst support, the catalyst may optionally be left to stand for a period of time, in some embodiments from about 6 hours to about 10 hours. The catalyst is then dried for a period of time at a desired temperature. In a particular embodiment the catalyst may be dried under a vacuum, optionally while a nitrogen stream is passed over the mixture. Finally, the catalyst may be calcined at a desired temperature and for a desired time to create the final catalyst product. (It should be noted that many of those familiar with inorganic synthesis are also familiar with techniques and various details related to the preparation of zeolite materials which would be used for the present invention).

Catalysts according to exemplary embodiments of the present invention may be created using either a manual or an automated process. Typically, a manual process is used for the preparation of catalysts of a larger mass, such as about 1 gram (g) to about 20 g. An automated process is typically used when the catalysts are of a smaller mass, such as about 5 milligrams (mg) to about 100 mg. Generally, manual and automated processes for the preparation of catalysts are similar, with the exception that an automated process involves automated measuring and dispensing of the precursor solutions to the catalyst support.

The SRC is present in a first zone while the RDC is present in a second zone. The first zone and the second zone are present in a specific spatial relationship to each other. In particular embodiments the second zone follows the first zone so that the gas stream comprising $NO_x$ comes into contact with the catalyst in the first zone before coming into contact with the catalyst in the second zone. In another embodiment the first and second zones are connected to each other. In still another embodiment the first zone and the second zone are spatially separated from each other. The distance between the two zones depends on the application in which the catalyst system is being used, and may be readily determined by those skilled in the art. In another embodiment the catalysts in the first and second zones are in contact with one another at the interface between the two zones. In still another embodiment, there may be some overlap between the catalysts in the first zone and the second zone at the interface between the two zones, but the order in which the gas stream comes into contact with the catalysts is still maintained.

In particular embodiments, the catalysts in the first zone and second zone are substantially separated from each other, which means that the gas stream comprising $NO_x$ comes into contact with all of, or at least greater than, about 60 wt. % of catalyst in the first zone, before coming into contact with any of catalyst in the second zone. The relative amounts of catalyst in the first and second zones may be readily optimized for reduction of $NO_x$ without undue experimentation, depending upon the process in which the catalyst system is employed, and other known factors.

The third zone, when present in the catalyst system, is present in a specific spatial relationship to the second zone. In particular embodiments, the third zone follows the second zone, so that the gas stream comes into contact with the catalyst in the second zone before the catalyst in the third zone. In another embodiment the second and third zones are connected to each other. In still another embodiment the second zone and the third zone are spatially separated from each other. The distance between the two zones depends on the application in which the catalyst system is being used, and may be readily determined by those skilled in the art. In another embodiment, the catalysts in the second and third zones are in contact with one another at the interface between the two zones. In still other embodiments there may be overlap between the catalysts in the second zone and the third zone at the interface between the two zones, but the order in which the gas stream comes into contact with the catalysts is still maintained. In particular embodiments, the catalysts in the second zone and third zone are substantially separated from each other, which means that the gas stream comprising $NO_x$ comes into contact with all of or at least greater than about 60 wt. % of catalyst in the second zone before coming into contact with any of catalyst in the third zone. The relative amounts of catalyst in the second and third zones may be readily optimized for reduction of $NO_x$ without undue experimentation, depending upon the process in which the catalyst system is employed, and other known factors.

In one embodiment, the reductant for use in the catalyst system of exemplary embodiments of the present invention comprises an organic compound comprising oxygen or nitrogen, or a mixture comprising oxygen and nitrogen. Said organic compounds are fluid, either as a liquid or gas, such that they may flow through the catalyst when introduced into an effluent gas stream for use in a catalyst system for the reduction of $NO_x$. Typically, hydrocarbons comprising oxygen or nitrogen and having less than about 16 carbon atoms will be fluid, although hydrocarbons comprising oxygen or nitrogen with higher numbers of carbon atoms may also be fluid, for example, depending on the chemical structure of the reductant and temperature of the gas stream.

The organic compounds comprising oxygen or nitrogen (or mixtures thereof) suitable for use as reductants typically comprise at least one functional group selected from the group consisting of hydroxy, alkoxy, carbonyl, carbonate, amine, imine, nitrile and combinations thereof. In some embodiments, the organic compounds comprising oxygen or nitrogen suitable for use as reductants comprise a member selected from the group consisting of an alcohol, an ether, an ester, a carboxylic acid, an aldehyde, a ketone, a carbonate, an amine, a nitrile, an imine, and combinations thereof. Some non-limiting examples of organic compounds comprising oxygen or nitrogen suitable for use as reductants comprise methanol, ethyl alcohol, n-butyl alcohol, 2-butanol, tertiary butyl alcohol, n-propyl alcohol, isopropyl alcohol, dimethyl ether, dimethyl carbonate, acetonitrile, methylamine, dimethylamine, ethanolamine, or the like, or combinations thereof.

In another embodiment, the reductant for use in the catalyst system comprises a hydrocarbon material. Hydrocarbon organic compounds are well-known in the art. For the present invention, the hydrocarbons usually have an average carbon chain length in the range of about 8 carbon atoms to about 24 carbon atoms. As used herein, "hydrocarbon" is meant to include single hydrocarbon compositions, as well as mixtures of hydrocarbons. Moreover, both straight-chain and branched hydrocarbons may be present. Cyclic hydrocarbons are also possible. While the hydrocarbons typically contain only carbon and hydrogen, it may be possible in some instances to include limited amounts of hydrocarbon derivatives, e.g., molecules containing functional groups which include atoms other than carbon and hydrogen. Usually, the hydrocarbon composition would contain no greater than about 20 mole % (total) of such non-hydrocarbon functional groups.

In some embodiments, the hydrocarbon material used as the reductant comprises a diesel composition. Diesel compositions (such as diesel fuel) usually comprise a mixture of saturated hydrocarbons and aromatic hydrocarbons. They are often obtained as the fractional distillate of petroleum fuel oil. One common example of a diesel composition is petroleum diesel or "petrodiesel". This grade, typically produced from petroleum, is a hydrocarbon mixture, obtained in the fractional distillation of crude oil between about 200 C and about 350° C., at about atmospheric pressure. One advantage of using diesel as a reductant lies in the fact that diesel fuel may already be present in a location proximate to the catalyst system used in $NO_x$ reduction. As an example, diesel may be used, wholly or partly, as the fuel in a power generation system (e.g., a gas turbine or diesel engine) which produces the combustion products requiring treatment.

In addition to industrial sources of diesel, such as petroleum refineries, diesel can be obtained by other techniques. As an illustration, diesel fuel can be obtained from agricultural sources. Non-limiting examples of non-refinery diesel-based products are biodiesel, biomass-to-liquid diesel (BTL); and gas-to-liquid diesel (GTL).

As alluded to above, the catalyst system for embodiments of the present invention may be used in conjunction with any process or system in which it may be desirable to reduce $NO_x$ emissions, such as a gas turbine; a steam turbine; a boiler; a locomotive; or a transportation exhaust system, such as, but not limited to, a diesel exhaust system. The catalyst system may also be used in conjunction with systems involving generating gases from burning coal, burning volatile organic compounds (VOC), or in the burning of plastics; or in silica plants, or in nitric acid plants. The catalysts are typically placed at a location within an exhaust system where they will be exposed to effluent gas comprising $NO_x$. Each catalyst may be arranged as a packed or fluidized bed reactor, coated on a monolithic, foam, mesh or membrane structure, or arranged in any other manner within the exhaust system, such that the catalyst is in contact with the effluent gas.

As will be appreciated by those ordinarily skilled in the art, although catalytic reactions are generally complex and involve many steps, the overall basic selective catalytic reduction reaction process for the reduction of $NO_x$ is believed to occur as follows:

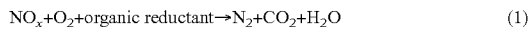

$$NO_x + O_2 + \text{organic reductant} \rightarrow N_2 + CO_2 + H_2O \quad (1)$$

The effluent gas stream usually comprises air, water, CO, $CO_2$, $NO_x$, and may also comprise other impurities. Additionally, uncombusted or incompletely combusted fuel may also be present in the effluent gas stream. The organic or hydrocarbon reductant is typically fed into the effluent gas stream to form a gas mixture, which is then fed through the catalyst. Sufficient oxygen to support the $NO_x$ reduction reaction may already be present in the effluent gas stream. If the oxygen present in the gas mixture is not sufficient for the $NO_x$ reduction reaction, additional oxygen gas may also be introduced into the effluent gas stream in the form of oxygen, air, or a mixture of oxygen with at least one other gas. In some embodiments the gas stream comprises from about 1 mole % to about 21 mole % of oxygen gas, based on total moles components in the gas stream. In some other embodiments, the gas stream comprises from about 1 mole % to about 15 mole % of oxygen gas, based on total moles components in the gas stream.

The catalyst system has two zones with an optional third zone. The first zone comprising the SRC may generally be used to convert $NO_x$ to nitrogen gas. During the conversion, intermediates are formed that may not be converted completely to nitrogen. The second zone comprising the RDC may be used to convert the intermediates into nitrogen. This ensures that there is sufficient conversion of $NO_x$ into nitrogen gas to meet the environmental standards. In a particular embodiment, essentially 100% of $NO_x$ is converted to nitrogen. Other noxious gases such as CO may also result as a byproduct of the process. Alternatively, CO may be part of the effluent gas stream that is fed into the catalyst. The DOC, when present, may be used to oxidize, for example, CO to the more benign $CO_2$ gas. Thus, the effluent gas stream comprising noxious gases may be converted into more benign gases that are acceptable to be released into the environment.

One advantage of embodiments of the present invention is that the reduction reaction may take place under "reductant lean" conditions. That is, the amount of reductant added to the effluent gas to reduce the $NO_x$ is generally low. Reducing the amount of reductant to convert the $NO_x$ to nitrogen may provide for a more efficient process that has decreased raw material costs. The molar ratio of reductant to $NO_x$ is typically in a range of from about 0.25:1 to about 6:1. In other embodiments, the ratio is typically such that the ratio of carbon atoms in the reductant is in a range of from about 0.5 mole to about 24 moles per mole of $NO_x$. In some other embodiments, the organic reductant and the $NO_x$ are present in a carbon:$NO_x$ molar ratio in a range of from about 0.5:1 to about 15:1. In a particular embodiment, the organic reductant and the $NO_x$ are present in a carbon:$NO_x$ molar ratio in a range of from about 0.5:1 to about 8:1. Another advantage of embodiments of the present invention is that the $NO_x$ may be reduced selectively to form benign $N_2$ gas. This reduces the chances of releasing other noxious gases into the environment.

The reduction reaction may take place over a range of temperatures. Typically, the temperature may range in one embodiment from about 100° C. to about 800° C., in another embodiment from about 200° C. to about 700° C., and in still another embodiment, from about 350° C. to about 650° C.

The reduction reaction may take place under conditions wherein the gas mixture is configured to have a space velocity suitable for the desired process configuration. In one embodiment, the gas mixture is configured to have a space velocity in a range of from about 5000 reciprocal hours ($hr^{-1}$) to about 100000 $hr^{-1}$, in another embodiment, in a range of from about 8000 $hr^{-1}$ to about 50000 $hr^{-1}$, and in still another embodiment, in a range of from about 8000 $hr^{-1}$ to about 40000 $hr^{-1}$. Exemplary embodiments of the catalyst system may also advantageously be used under wet conditions. In particular, $NO_x$ reduction accomplished using exemplary embodiments of the present invention may be effective in effluent gas streams comprising water. In some embodiments, the gas stream comprises from about 1 mole % to about 12 mole % of water, and in some other embodiments, from about 2 mole % to about 10 mole % of water, based on total moles components in the gas stream.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art, using no more than routine experimentation, and all such modifications and equivalents are believed to be within the spirit and scope of the invention as defined by the following claims. All of the patents, patent applications, articles, and texts which are mentioned above are incorporated herein by reference.

The invention claimed is:

1. A catalyst system for the reduction of $NO_x$ comprising:
   (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium, and mixtures thereof;
   (ii) a catalyst in a second zone following said first zone; said catalyst comprising a second catalyst support and a zeolite material; and
   (iii) a gas stream comprising $NO_x$ and an organic reductant selected from the group consisting of
      (A) compounds comprising oxygen or nitrogen, or a combination of oxygen and nitrogen; and
      (B) hydrocarbon materials;
   wherein the catalysts in the first zone and second zone are substantially separated from each other.

2. The catalyst system of claim 1, further comprising a catalyst in a third zone following said second zone; said catalyst comprising a third catalyst support and a third catalytic metal selected from the group consisting of platinum, palladium, and mixtures thereof; wherein the catalyst in the third zone is substantially separated from the catalyst in the second zone.

3. The catalyst system of claim 2, wherein said first catalyst support, said second catalyst support, and said third catalyst support independently comprise at least one member selected from the group consisting of alumina, titania, zirconia, ceria, silicon carbide and mixtures thereof.

4. The catalyst system of claim 1, wherein said first catalytic metal comprises gallium in a range of from about 1 mole % to about 31 mole %, based on total moles of first catalytic metal, promoting metal, and first catalyst support.

5. The catalyst system of claim 1, wherein said promoting metal is present in a range of from about 1 mole % to about 22 mole %, based on total moles of first catalytic metal, promoting metal, and first catalyst support.

6. The catalyst system of claim 1, wherein the zeolite material is a natural material or a synthetic material.

7. The catalyst system of claim 1, wherein the zeolite material is characterized by an intermediate pore size in the range of about 3 angstroms to about 7 angstroms.

8. The catalyst system of claim 1, wherein the zeolite material is in a cation-exchanged form, and comprises at least one cation based on a metal selected from the group consisting of iron, copper, cobalt, molybdenum, silver, platinum, palladium, gold, and rhodium.

9. The catalyst system of claim 8, wherein the zeolite material comprises iron and copper cations.

10. The catalyst system of claim 1, wherein the zeolite material is selected from the group consisting of ZSM-5, ZSM-12, ZSM-22, ZSM-23, ZSM-34, ZSM-35, ZSM-38, ZSM-48; ZSM-50; ZSM-57, silicalite, silicalite 2; zeolite A, zeolite Y, zeolite X, zeolite beta, ferriertie, and combinations which include one or more of the foregoing.

11. The catalyst system of claim 1, wherein the organic reductant is selected from the group consisting of an alcohol, a hydroxy group, an alkoxy group, an ether, a carbonyl group, an ester, a carboxylic acid, an aldehyde, a ketone, a carbonate, an amine, a nitrile, an imine, and combinations thereof.

12. The catalyst system of claim 11, wherein the organic reductant is selected from the group consisting of methanol, ethyl alcohol, n-butyl alcohol, 2-butanol, tertiary butyl alcohol, n-propyl alcohol, isopropyl alcohol, dimethyl ether, dimethyl carbonate, acetonitrile, ethanolamine, propylene oxide, propylene glycol, methylamine, dimethylamine, and combinations thereof.

13. The catalyst system of claim 1, wherein the hydrocarbon material for the organic reductant has an average carbon chain length in the range of about 8 carbon atoms to about 24 carbon atoms.

14. The catalyst system of claim 1, wherein the hydrocarbon material comprises a diesel composition.

15. The catalyst system of claim 14, wherein the diesel composition comprises saturated hydrocarbons and aromatic hydrocarbons.

16. The catalyst system of claim 14, wherein the diesel composition comprises a fractional distillate of petroleum fuel oil.

17. The catalyst system of claim 14, wherein the diesel composition comprises at least one material selected from the group consisting of biodiesel, biomass-to-liquid diesel (BTL); and gas-to-liquid diesel (GTL).

18. The catalyst system of claim 1, wherein said organic reductant and said $NO_x$ are present in a carbon:$NO_x$ molar ratio from about 0.5:1 to about 24:1.

19. The catalyst system of claim 1, wherein said gas stream further comprises water in a range of from about 1 mole % to about 12 mole %, based on total moles components in the gas stream.

20. The catalyst system of claim 1, wherein said gas stream further comprises oxygen gas in a range of from about 1 mole % to about 21 mole %, based on total moles components in the gas stream.

21. The catalyst system of claim 1, wherein $NO_x$ is present in effluent gas from a combustion source, said combustion source comprising at least one of a gas turbine, a steam turbine, a boiler, a locomotive, a transportation exhaust system, a diesel exhaust system, coal burning, plastics burning, volatile organic compound burning, a silica plant, or a nitric acid plant.

22. A method for reducing $NO_x$, which comprises the steps of:
(a) providing a gas stream comprising $NO_x$ and an organic reductant comprising (I) oxygen or nitrogen, or a combination of oxygen and nitrogen; or (II) a hydrocarbon material; and
(b) contacting said gas stream with a catalyst system, wherein said catalyst system comprises (i) a catalyst in a first zone; said catalyst comprising a first catalyst support, a first catalytic metal comprising gallium, and at least one promoting metal selected from the group consisting of silver, gold, vanadium, zinc, tin, bismuth, cobalt, molybdenum, tungsten, indium, and combinations thereof, and (ii) a catalyst in a second zone following said first zone; said catalyst in the second zone comprising a second catalyst support and a zeolite material.

23. The method of claim 22, wherein said contacting is at a temperature in a range of from about 100° C. to about 600° C.

24. The method of claim 22, wherein said contacting is performed at a space velocity in a range of from about 5000 $hr^{-1}$ to about 100000 $hr^{-1}$.

25. The method of claim 22, wherein said catalyst system further comprises a catalyst in a third zone following said second zone; said catalyst comprising a third catalyst support and a catalytic metal selected from the group consisting of platinum, palladium, and mixtures thereof.

26. The method of claim 25, wherein said first catalyst support, second catalyst support and third catalyst support independently comprise at least one member selected from the group consisting of alumina, titania, zirconia, ceria, silicon carbide and mixtures thereof.

27. The method of claim 22, wherein said first catalytic metal comprises gallium in the range of from about 1 mole % to about 31 mole %, based on total moles of first catalytic metal, promoting metal, and first catalyst support.

28. The method of claim 22, wherein said promoting metal is present in a range of from about 1 mole % to about 22 mole %, based on total moles of first catalytic metal, promoting metal, and first catalyst support.

29. The method of claim 22, wherein said organic reductant is selected from the group consisting of an alcohol, a hydroxy group, an alkoxy group, an ether, a carbonyl group, an ester, a carboxylic acid, an aldehyde, a ketone, a carbonate, an amine, a nitrile, an imine, a hydrocarbon composition, and combinations thereof.

30. The method of claim 22, wherein $NO_x$ is present in effluent gas from a combustion source, said combustion source comprising at least one of a gas turbine, a steam turbine, a boiler, a locomotive, a transportation exhaust system, a diesel exhaust system, coal burning, plastics burning, volatile organic compound burning, a silica plant, or a nitric acid plant.

* * * * *